US012435845B2

(12) United States Patent
Kaye et al.

(10) Patent No.: US 12,435,845 B2
(45) Date of Patent: Oct. 7, 2025

(54) HEADLAMP ASSEMBLY WITH SELECTABLE POWER SOURCE

(71) Applicant: LB Marketing, Inc., Alpharetta, GA (US)

(72) Inventors: Douglas R. Kaye, Alpharetta, GA (US); Jack Grembowitz, Roswell, GA (US); Kaif Dosani, Lawrenceville, GA (US)

(73) Assignee: LB MARKETING, INC., Alpharetta, GA (US)

( * ) Notice: Subject to any disclaimer, the term of this patent is extended or adjusted under 35 U.S.C. 154(b) by 0 days.

(21) Appl. No.: 18/415,967

(22) Filed: Jan. 18, 2024

(65) Prior Publication Data

US 2025/0237363 A1 Jul. 24, 2025

(51) Int. Cl.

| | |
|---|---|
| ***F21L 4/08*** | (2006.01) |
| ***F21V 5/00*** | (2018.01) |
| ***F21V 14/06*** | (2006.01) |
| ***F21V 21/084*** | (2006.01) |
| ***F21V 23/00*** | (2015.01) |
| ***F21V 23/02*** | (2006.01) |
| ***F21V 23/04*** | (2006.01) |
| ***F21Y 101/00*** | (2016.01) |

(Continued)

(52) U.S. Cl.

CPC .............. *F21L 4/085* (2013.01); *F21V 5/006* (2013.01); *F21V 14/065* (2013.01); *F21V 21/084* (2013.01); *F21V 23/008* (2013.01); *F21V 23/023* (2013.01); *F21V 23/0414* (2013.01); *H05B 45/10* (2020.01); *F21Y 2101/00* (2013.01); *F21Y 2115/10* (2016.08)

(58) Field of Classification Search

CPC ..... F21L 4/085; F21L 4/08; F21L 4/04; F21L 4/045; F21L 4/00; F21V 21/084; F21V 23/0414; F21V 23/02; F21V 23/008; F21V 5/006; F21V 14/065; F21V 23/084

See application file for complete search history.

(56) References Cited

U.S. PATENT DOCUMENTS

| | | | | |
|---|---|---|---|---|
| 2009/0323317 A1* | 12/2009 | Spartano | ............. | F21V 23/0414 362/105 |
| 2019/0390845 A1* | 12/2019 | Ljunggren | ............ | F21V 21/084 |
| 2020/0248896 A1* | 8/2020 | Gall | .......................... | F21L 4/04 |

(Continued)

FOREIGN PATENT DOCUMENTS

| | | | | |
|---|---|---|---|---|
| CN | 108036212 A | * | 5/2018 | ............. F21L 4/005 |
| CN | 109488908 A | * | 3/2019 | |

*Primary Examiner* — Erin Kryukova

(74) *Attorney, Agent, or Firm* — Perilla Knox & Hildebrandt LLP; Kenneth A. Knox

(57) ABSTRACT

A headlamp assembly includes a light-emitting element, a primary power source, and a secondary power source. The primary power source can include disposable batteries, and the secondary power source can include a rechargeable battery. The headlamp assembly features a sliding switch mechanism located on the back of the headlamp assembly, allowing the user to select the desired power source. The light source may be a light-emitting diode (LED). The sliding switch mechanism moves left and right to switch between the rechargeable power source and the alkaline power source, providing the user with the flexibility to choose the power source that suits their specific requirements or preferences at any given time.

22 Claims, 6 Drawing Sheets

(51) Int. Cl.

| | |
|---|---|
| ***F21Y 115/10*** | (2016.01) |
| ***H05B 45/10*** | (2020.01) |

(56) References Cited

U.S. PATENT DOCUMENTS

| | | | | |
|---|---|---|---|---|
| 2020/0281297 | A1* | 9/2020 | Kaye | F21V 23/0471 |
| 2021/0348734 | A1* | 11/2021 | Bertken | F21V 5/006 |
| 2022/0346484 | A1* | 11/2022 | Deshpande | A42B 3/04 |

* cited by examiner

HEADLAMP ASSEMBLY WITH SELECTABLE POWER SOURCE

TECHNICAL FIELD

The present disclosure generally relates to headlamp assemblies, specifically to those featuring dual power sources with a selector switch for toggling between rechargeable and non-rechargeable power sources.

BACKGROUND

Headlamps are commonly used in various activities that require hands-free illumination. These activities range from outdoor pursuits such as camping, hiking, and spelunking, to professional applications in industries like mining, construction, and law enforcement. Headlamps provide a convenient and efficient way to illuminate the user's field of view, allowing them to perform tasks in low-light or dark conditions without the use of handheld lighting devices.

BRIEF SUMMARY

In general, in a first aspect, the subject matter of the present disclosure features a headlamp assembly having a first housing configured to be worn on a front surface of a head of an operator. The first housing includes a light-emitting element and a secondary power source, which is rechargeable. The headlamp assembly also includes a second housing separate from the first housing that is configured to be worn on a rear surface of the head of the operator. The second housing includes a primary power source and a selector, and is electrically coupled to the first housing. The primary power source is not rechargeable. The headlamp assembly also includes circuitry configured to toggle power provided to the light-emitting element between the disposable power source and the rechargeable power source based at least in part on an orientation of the selector.

Embodiments of the subject matter may include one or more of the following features. The light-emitting element may be a light-emitting diode (LED), such as an LED lens, LED panel, and so forth, and the selector may be a selector switch configured to toggle between a first position and a second position. The disposable power source may be at least one alkaline battery. The rechargeable power source may be at least one rechargeable battery selected from a group consisting of: nickel-cadmium (NiCd), nickel-metal hydride (NiMH), lithium-iron phosphate (LFP); rechargeable alkaline manganese (RAM); and lithium-ion (Li-ion). The selector switch may be disposed on a front surface of the second housing. The first housing may comprise a power button separate from the selector switch that toggles the light-emitting element between at least on and off states.

In another aspect, the subject matter features a headlamp assembly having a front head assembly including a first housing, a light source, and a power switch. The headlamp assembly also includes a rear battery pack assembly including a second housing and a bidirectional sliding switch. The front head assembly and the rear battery pack assembly are electrically coupled to one another. The bidirectional sliding switch is configured to select between a rechargeable power source and an alkaline power source housed within the headlamp assembly.

Embodiments of the subject matter may include one or more of the following features. The front head assembly may further comprise a bezel surrounding the light source, wherein the light source is a light-emitting diode. The headlamp assembly may further comprise circuitry disposed within the first housing, wherein the circuitry is configured to adjust different modes of operation of the LED. The different modes of operation can include varying a luminous intensity of the LED.

The front head assembly may further comprise a charging port for charging the rechargeable power source. The charging port can be a universal serial bus (USB) port. The rear battery pack assembly may further include strap arms extending from opposing lateral sides of the second housing for attachment to a headband. The rear battery pack assembly may further comprise a pivoting arm, allowing access to the alkaline power source for replacement. The rechargeable power source may be a rechargeable battery, and the alkaline power source may comprise one or more disposable batteries. The front head assembly and the rear battery pack assembly may be coupled to one another via an elastic band and an electrical wire, as can be appreciated.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a headlamp assembly 100 that includes a front head assembly and a rear battery pack assembly. The front head assembly and the rear battery pack assembly may be electrically coupled to one another via one or more wires. The front head assembly may include a first housing, a light-emitting diode (LED), a power switch, and in some cases, a charging port. The rear battery pack assembly may include a second housing, a selector (e.g., bidirectional sliding switch), and a pivoting arm.

The front head assembly can be configured to be worn on a front surface of a head of an operator. The front head assembly may include a light-emitting element and a secondary power source. The secondary power source may be rechargeable. The rear battery pack assembly, separate from the first housing, is configured to be worn on a rear surface of the head of the operator. The rear battery pack assembly may include a primary power source and a selector. The primary power source may not be rechargeable; rather, the primary power source may include one or more disposable batteries. The headlamp assembly may also include circuitry configured to toggle power provided to the light-emitting element between the disposable power source and the rechargeable power source based at least in part on an orientation of the selector.

In some cases, the light-emitting element may be a light-emitting diode (LED), and the selector may be a selector switch, also referred to as a power selector switch, configured to toggle between a first position and a second position. The disposable power source may be at least one alkaline battery. The rechargeable power source may be at least one rechargeable battery, such as one or more nickel-cadmium (NiCd), nickel-metal hydride (NiMH), lithium-iron phosphate (LFP); rechargeable alkaline manganese (RAM); and lithium-ion (Li-ion) batteries. The selector switch may be disposed on a front surface of the second housing. The first housing may comprise a power button separate from the selector switch that toggles the light-emitting element between at least on and off states.

Figure 1:
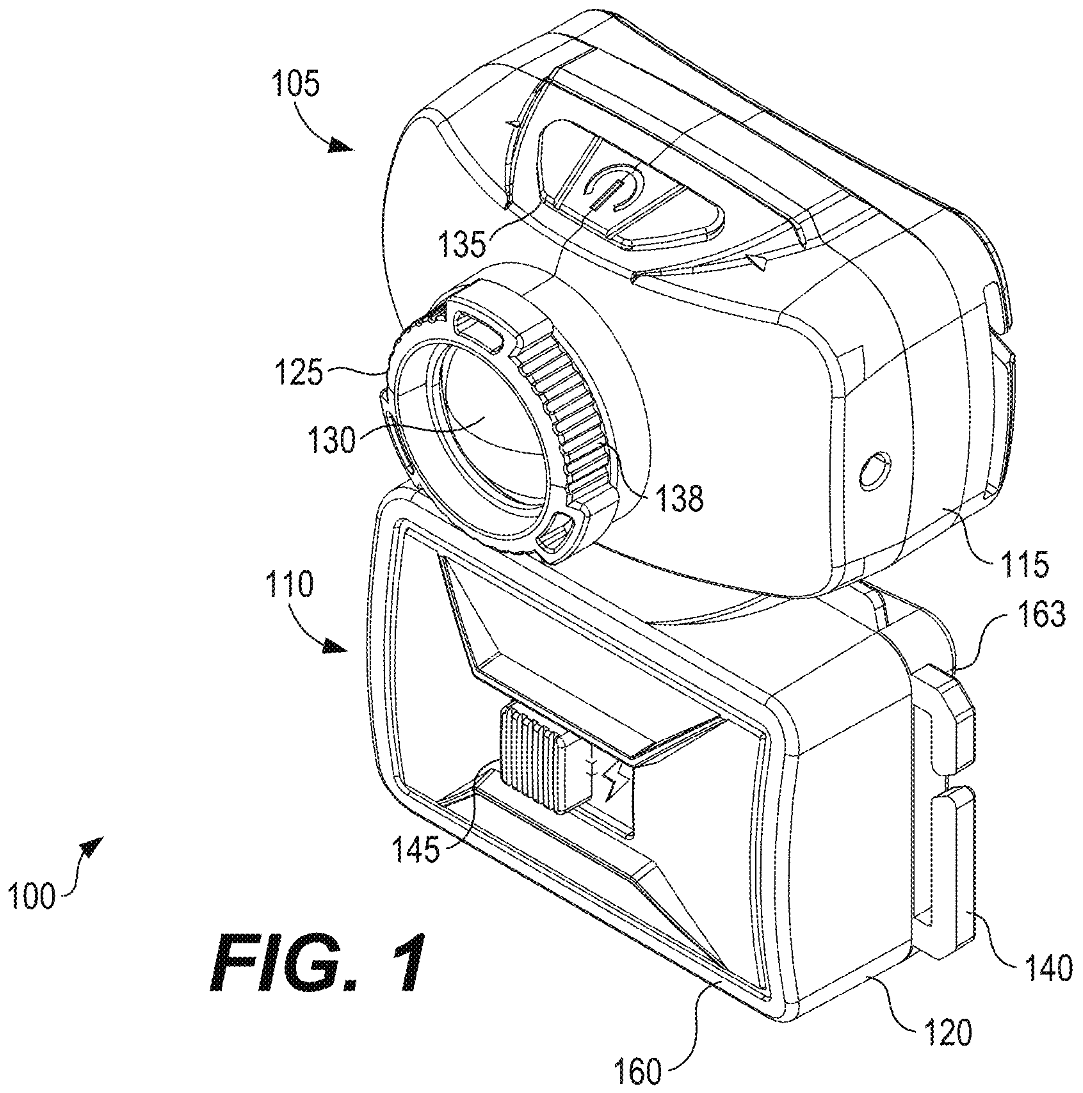
FIG. 1 is a perspective view of a headlamp assembly, showing a front head assembly and a rear battery pack assembly according to various embodiments of the present disclosure.

Turning now to the drawings, FIG. 1 shows a perspective view of the headlamp assembly 100 according to various embodiments. The headlamp assembly 100 includes a front head assembly 105 and a rear battery pack assembly 110. The front head assembly 105 and the battery pack assembly 110 are shown in FIG. 1 as arranged in a vertical, stacked configuration; however, such configuration is merely for explanatory purposes. During operation, the front head assembly 105 may be worn on a forehead of an operator, whereas the battery pack assembly 110 may be worn on a rear surface of the head of the operator as can be appreciated. Thus, a rear surface of the first housing 115 and a rear surface of the second housing 120 may be ergonomically contoured to match that of a forehead and rear of the head of the operator, respectively.

The front head assembly 105 and the battery pack assembly 110 may be coupled to one another via a band, such as an elastic band, in some cases. Furthermore, the front head assembly 105 and the battery pack assembly 110 may be electrically coupled to one another via an electrical wire. The electrical wire and the band are not shown for explanatory purposes, but are understood in the field.

The front head assembly 105 includes a housing, referred to herein as a first housing 115. The first housing 115 may include a bezel 125, a light-emitting diode (LED) 130, a power button 135, among other components not shown or described. In some cases, the bezel 125 may secure the LED 130 and focus or otherwise direct light emitted by the LED 130. Additionally, the bezel 125 may service as a gripping mechanism, useful in positioning the headlamp assembly 100 on the head of the operator, reorientating the headlamp assembly 100, and so forth. Thus, the bezel 125 may include a multitude of ridges 138 for gripping. The power button 135 may be positioned to allow the user to turn the headlamp on and off, or adjust different modes of operation, as will be described.

Similarly, the battery pack assembly 110 includes a housing, referred to herein as a second housing 120. The second housing 120 of the battery pack assembly 110 may include a selector, such as a switch 145. In the example shown in FIG. 1, the switch 145 is a bidirectional sliding selector switch situated on the front face of the second housing 120. When positioned on the head of the operator, the switch 145 will project outward relative to the front surface of the second housing 120 as well as a rear surface of the head of the operator. The switch 145 may be configured to select between a rechargeable power source and an alkaline power source housed within the headlamp assembly 100, as will be described in greater detail below.

Figure 2:
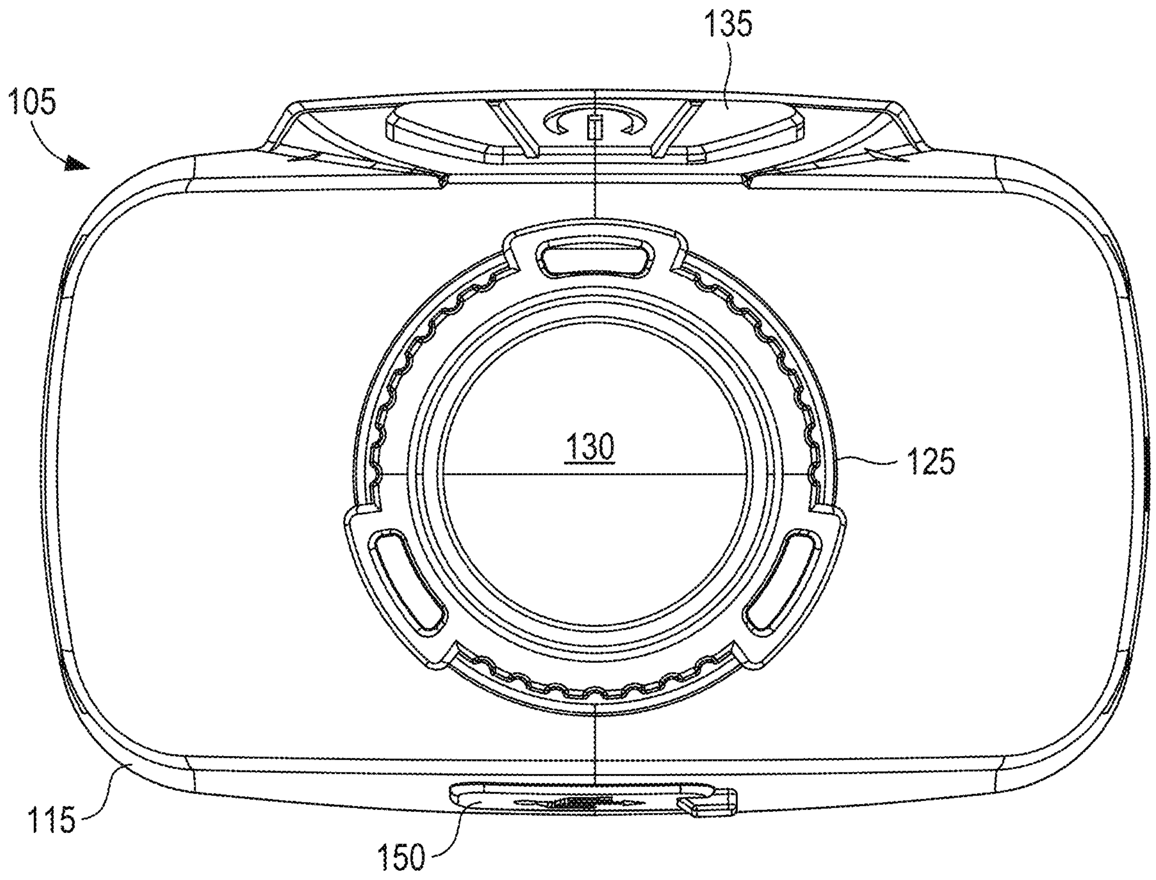
FIG. 2 is a front view of the front head assembly of the headlamp assembly, showing an LED, a power switch, and a charging port according to various embodiments of the present disclosure.

Turning to FIG. 2, a front view of the front head assembly 105 of the headlamp assembly 100 is shown according to various embodiments. The front head assembly 105 may include the first housing 115 that provides structure and protection to circuitry, power sources, and other components stored therein. The LED 130 may be located at the center of the first housing 115, which is surrounded by the bezel 125. The bezel 125 may serve to secure the LED 130 and focus or otherwise direct light emitted by the LED 130. In some cases, the bezel 125 may surround the LED 130 to focus or direct light emitted by the LED 130. While various embodiments described herein relate to an LED 130, it is understood that other illumination elements can be provided, such as incandescent light bulbs, LED panels, LED bulbs, and so forth.

The power button 135 may be positioned above the LED 130, allowing the user to turn the headlamp on and off, or adjust different modes of operation, through interactions with the circuitry stored within the first housing 115. For instance, manipulation of the power button 135 can cause the circuitry to toggle the LED 130 on or off, toggle the LED 130 between different luminous intensities, cause the LED 130 to pulse or flash periodically, provide a constant beam of the LED 130, and so forth. In some cases, the power button 135 may be configured to toggle the LED 130 between different luminous intensities.

In some embodiments, the luminous intensities can range from 20 to 100 lumens, which is suitable for tasks like reading or navigating a campsite at close distances. In some embodiments, the luminous intensities can range between 100 to 300 lumens, which is suitable for hiking or work in dark areas where a bit more light is helpful for seeing at medium distances. In further embodiments, the luminous intensities can range from 300 to 1000 lumens, suitable for more demanding tasks that require bright light, such as trail running or searching in dark environments. The luminous intensity a user may require can depend on several factors, including the specific activity, the distance they wish to illuminate, battery life considerations, and whether they require a wide beam for peripheral vision or a focused beam for distance. Thus, the headlamp assembly 100 offers adjustable settings to provide a range of intensities to suit different conditions and conserve battery life for both power sources.

The first housing 115 may include a charging port 150 for charging the rechargeable power source which can be covered by a charging port cover, protecting the charging electronics. The charging port 150 may include a universal serial bus (USB) port in some implementations, such as USB Type-C, USB 2.0, micro-USB, and so forth. It is understood that other charging standards can be utilized, as understood in the field.

Figure 3:
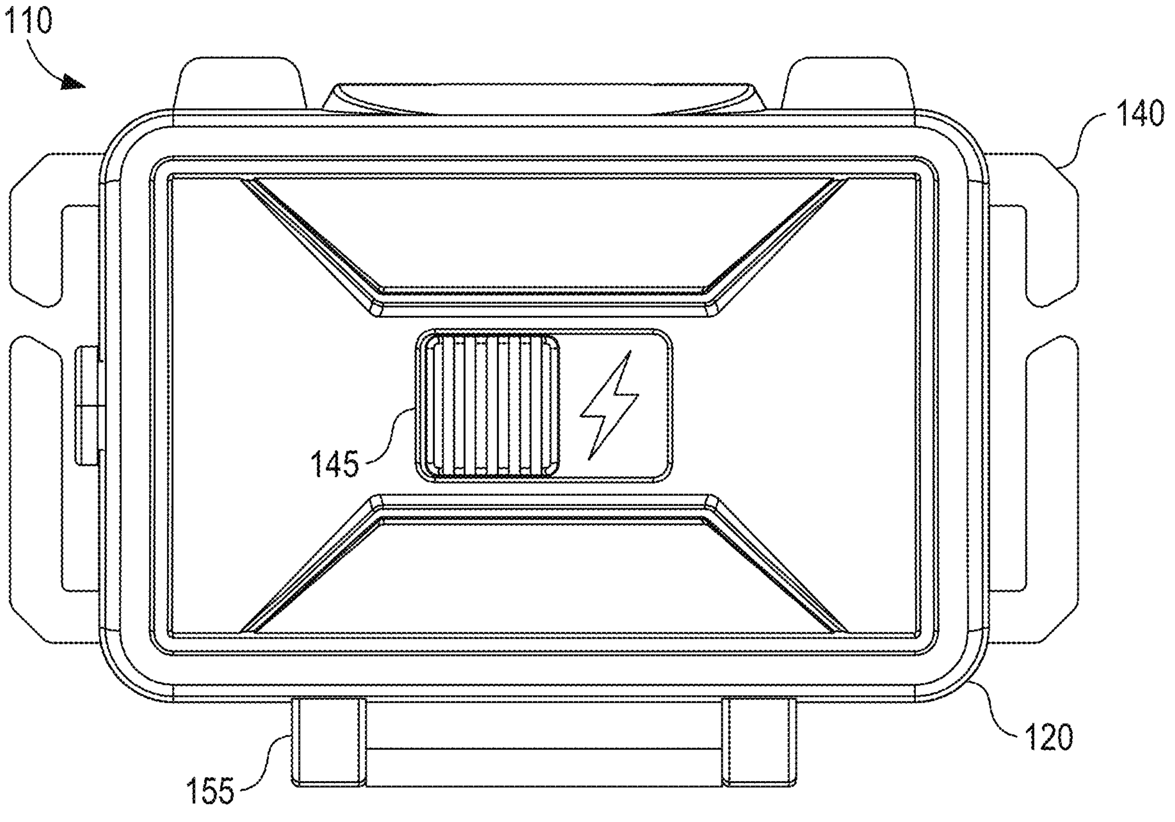
FIG. 3 is a front view of the battery pack assembly of the headlamp assembly, showing a bidirectional sliding switch for selecting the power source and a pivoting arm for accessing internal components according to various embodiments of the present disclosure

Turning to FIG. 3, a front view of the battery pack assembly 110 of the headlamp assembly 100 is shown. The second housing 120 of the battery pack assembly 110 may enclose various internal components (e.g., power source and circuitry) and provide structural support. In some cases, strap arms 140 may extend from opposing lateral sides of the second housing 120. These strap arms 140 may connect to a headband or similar attachment mechanism for wearing the headlamp assembly 100. In other cases, the strap arms 140 may be used for other attachment mechanisms.

A switch 145 may be provided that, in some embodiments, is centrally located on the second housing 120. The switch 145 may be depicted as a bidirectional sliding switch for selecting the power source. In some cases, the switch 145 may be configured to select between a rechargeable power source and an alkaline power source housed within the headlamp assembly 100. In other cases, the switch 145 may be configured to select between other types of power sources. It is understood that, when the switch 145 is in a first position, the power source in the first housing 115 is utilized, which may be a rechargeable battery. Manipulation of the power button 135 therefore directs illumination of the LED 130 using the power source of the first housing 115. Conversely, when the switch 145 is in a second, different position, the power source in the second housing 120 is utilized, which may be one or more disposable batteries. Manipulation of the power button 135 while the switch 145 is in the second position therefore directs illumination of the LED 130 using the power source of the second housing 120.

A pivoting arm 155 is shown on the bottom of the second housing 120. In some embodiments, a front surface 160 (FIG. 1) and a rear surface 163 (FIG. 1) of the second housing 120 can pivot relative to one another, thereby forming a clamshell-style housing. For instance, the pivoting arm 155 can be opened to access disposable batteries stored therein, and replace the disposable batteries with fresh batteries. In other cases, the pivoting arm 155 may be used to access other components within the second housing 120.

Figure 4:
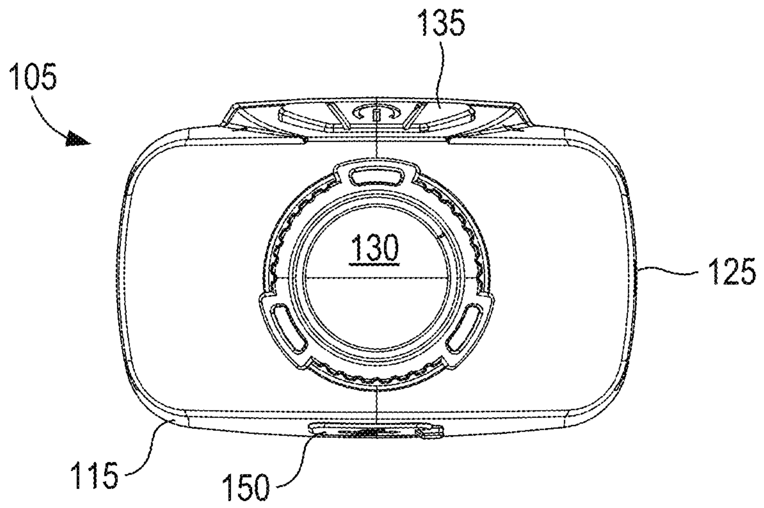
FIGS. 4 and 5 are front views of the front head assembly and the battery pack assembly, respectively, showing their components and features.
Figure 5:
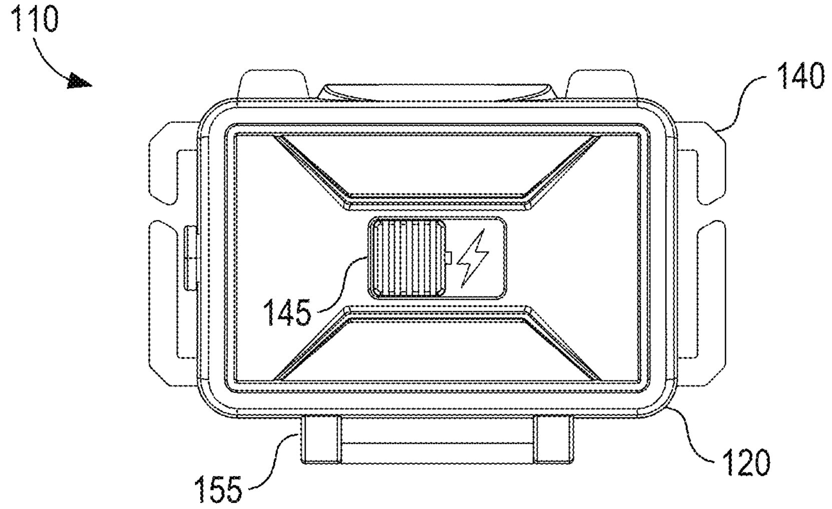

Referring now to FIGS. 4 and 5, front views of the front head assembly 105 and the battery pack assembly 110 of the headlamp assembly 100 are shown, respectively. In FIG. 4, the front head assembly 105 may include a first housing 115, a bezel 125 surrounding the LED 130, and a power button 135 located above the LED 130. The bezel 125 may serve to secure the LED 130 and focus or otherwise direct light emitted by the lens 130. The power button 135 may be positioned to allow the user to turn the headlamp on and off, or adjust different modes of operation as described above. In some cases, the power button 135 may be configured to toggle the LED 130 between different luminous intensities.

In FIG. 5, the battery pack assembly 110 may include a second housing 120, strap arms 140 extending from the sides for attachment to a headband, a switch 145 positioned centrally for selecting the power source, and a pivoting arm 155 at the bottom, providing the ability to access internal components. The strap arms 140 may connect to an elastic headband or similar attachment mechanism for wearing the headlamp assembly 100. In some cases, the strap arms 140 may be used for other attachment mechanisms.

The switch 145, which may be a selector switch configured to toggle between a first position and a second position, may be disposed on a front surface of the second housing 120. The switch 145 may be configured to select between a rechargeable power source and an alkaline power source housed within the headlamp assembly 100. In other cases, the switch 145 may be configured to select between other types of power sources.

Figure 6:
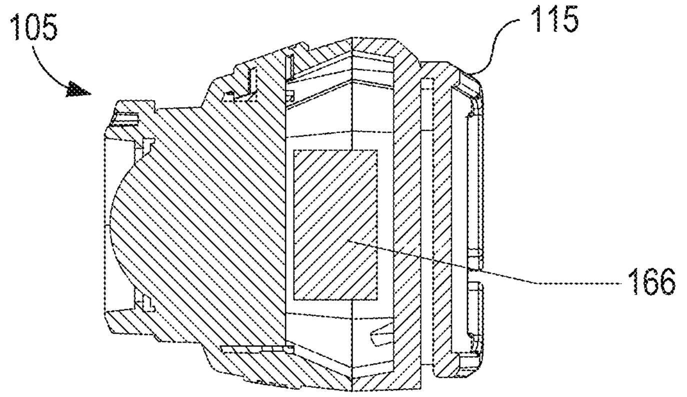
FIGS. 6 and 7 are cross-sectional views of the front head assembly and the battery pack assembly, respectively, showing various internal components according to various embodiments of the present disclosure.
Figure 7:
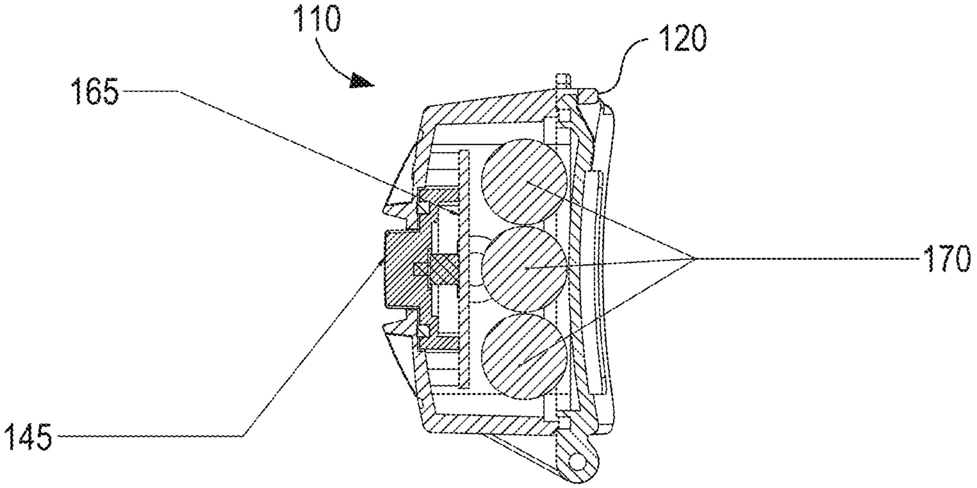

Turning now to FIGS. 6 and 7, cross-sectional views of the front head assembly 105 and the battery pack assembly 110 of the headlamp assembly 100 are shown, respectively. In FIG. 6, a secondary power source 166 is centrally located within the front head assembly 105; however, other orientations and arrangements of the secondary power source 166 can be provided. The secondary power source 166 may include a rechargeable battery integrally formed with the first housing 115; however, in alternative embodiments, the secondary power source 166 can be a disposable battery accessible through manipulation of the first housing 115.

In FIG. 7, the battery pack assembly 110 houses a primary power source, such as one or more rechargeable batteries 170, and a printed circuit board (PCB) 165. The rechargeable batteries 170 may be at least one rechargeable battery selected from a group consisting of: nickel-cadmium (NiCd), nickel-metal hydride (NiMH), lithium-iron phosphate; and lithium-ion (Li-ion). In some cases, the rechargeable batteries 170 may be replaced with one or more disposable alkaline batteries. The PCB 165 may be enclosed within the battery pack assembly 110 and may be electrically connected to the switch 145, which is positioned externally on the second housing 120. The PCB 165 may include the circuitry of the battery pack assembly 110. The switch 145 may be configured to select between the rechargeable batteries 170 and an alkaline power source housed within the headlamp assembly 100 via the circuitry.

The PCB 165 may thus include circuitry configured to adjust different modes of operation of the LED 130, including varying a luminous intensity of the LED 130. Alternatively, such circuitry can be separate from the circuitry of the second housing 120, and thus can be housed in the first housing 115. In some cases, the circuitry of either the first housing 115 and/or the second housing 120 may be configured to toggle the LED 130 between different luminous intensities, flashing of the LED 130, providing a constant beam of the LED 130, and so forth. The switch 145 may be accessible from the outside for user interaction, allowing the user to select the power source for the headlamp assembly 100.

The first housing 115 and/or the second housing 120 of the headlamp assembly 100 can be formed of a variety of materials, selectively chosen for its properties such as durability, weight, resistance to environmental factors, and cost. In some embodiments, the first housing 115 and/or the second housing 120 are formed of plastic, aluminum, stainless steel, titanium, composite materials, rubber or silicone overmolds, and/or any combination thereof. For instance, in some embodiments, the first housing 115 and/or the second housing 120 can be made from high-strength plastics like acrylonitrile butadiene styrene (ABS) or polycarbonate. Such materials are lightweight, relatively inexpensive, and can be easily molded into complex shapes. They also offer good resistance to impact and corrosion.

Aluminum is widely used for its excellent strength-to-weight ratio, durability, and thermal conductivity, which can help dissipate heat from the LED 130 or other lighting element. Aluminum is also corrosion-resistant and can be anodized for additional surface protection. Stainless steel can be employed for its high strength and resistance to corrosion and impact. Stainless steel, however, is heavier than aluminum and plastic, which can be a drawback for the headlamp assembly 100 if worn for extended periods. Titanium is less common due to higher cost, but titanium offers exceptional strength, is lightweight, and has high corrosion resistance. In various embodiments, the headlamp assembly 100 may be formed of various composite materials, which can include a mix of plastics and fibers (e.g., carbon fiber or glass fiber) to create a first housing 115 and/or second housing 120 that is lightweight and has high tensile strength.

In some embodiments, rubber or silicone overmolds can be provided to supply additional grip, impact resistance, and protection against moisture. Generally, the choice of material may depend on the intended use of the headlamp assembly 100. For example, the headlamp assembly 100, if used in hazardous environments, may prioritize durability and resistant materials, while one designed for ultralight backpacking would prioritize weight savings.

Figure 8:
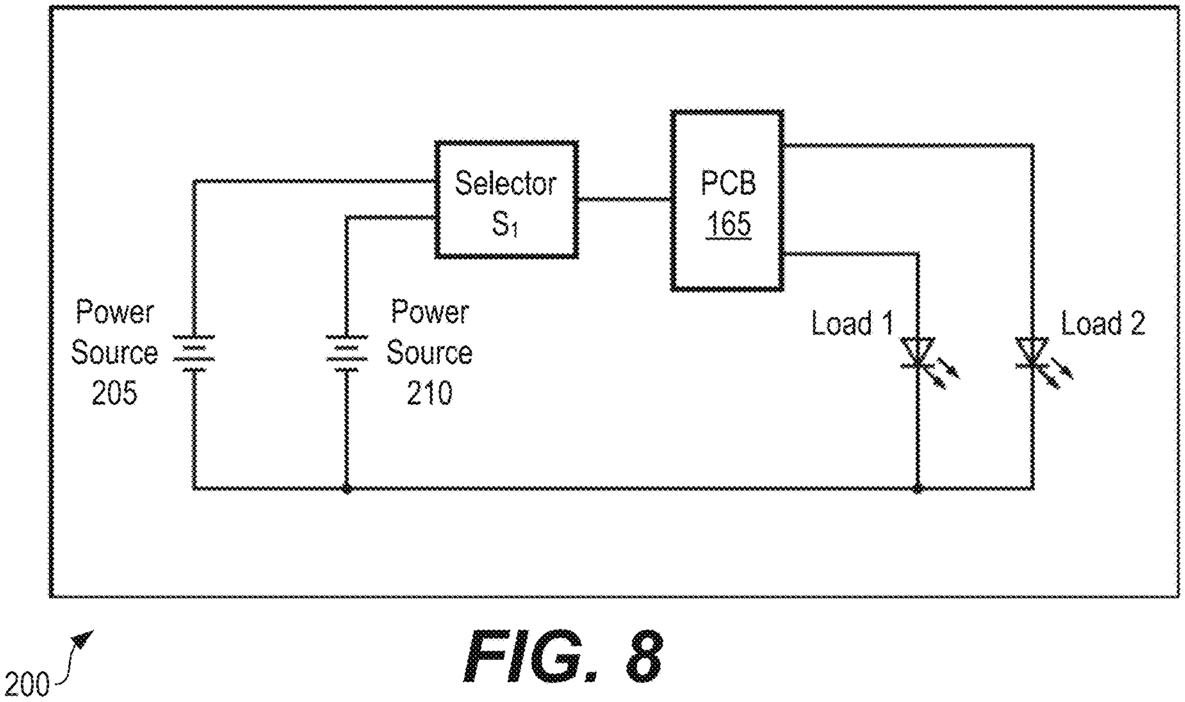
FIG. 8 is an example circuit diagram of circuitry of the headlamp assembly according to various embodiments of the present disclosure.

Referring now to FIG. 8, an example circuit diagram 200 is shown according to various embodiments. The example circuit diagram 200 can be embodied in the circuitry of the first housing 115 and/or the second housing 120, such as the PCB 165. The example circuit diagram 200 includes a first power source 205, a second power source 210, a switch S1 145, smoothing circuitry 215, as well as a load, which may include the LED 130 as can be appreciated. Generally, the switch S1 145 can direct the load (e.g., LED 130 or other first load 1 or second load 2) to utilize either the first power source 205 or the second power source 210 based on an orientation of the switch S1 145. In either event, the circuitry can include smoothing circuitry 215 that handles switchovers between the different power sources 205, 210 without spikes in voltage or current, potentially damaging the LED lens 130 or other load.

Figure 9:
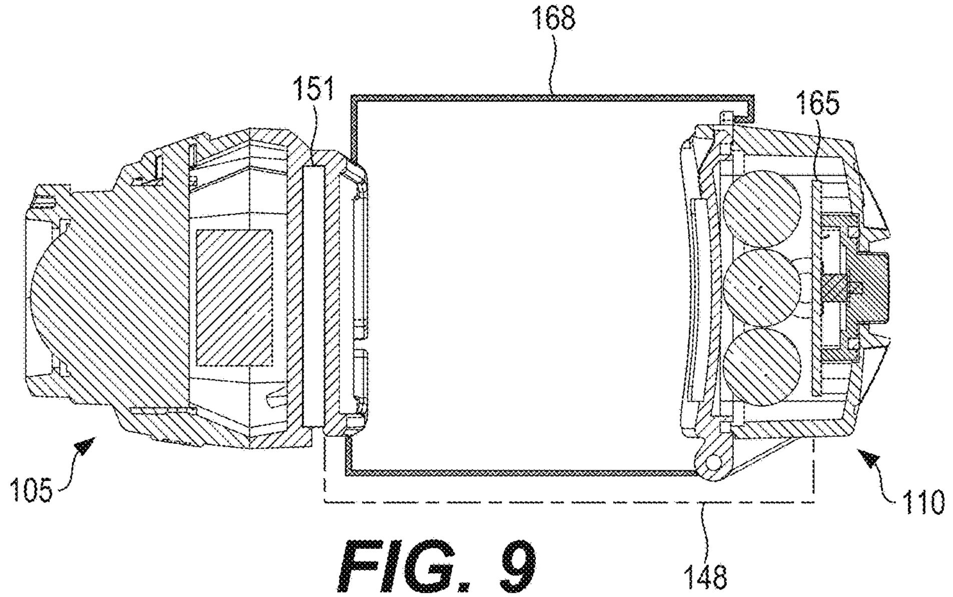
FIG. 9 is a cross-sectional view of the front head assembly and the battery pack assembly, respectively, showing various internal components according to various embodiments of the present disclosure.

FIG. 9 illustrates an electrical cable 148 that electrically couples the front head assembly 105 and the battery pack assembly 110. As noted above, the battery pack assembly 110 includes PCB 165 which embodies or includes the circuitry of the battery pack assembly 110. Similarly, the front head assembly 105 can include a PCB 151 that embodies or includes the circuitry of the front head assembly 105. An elastic band 168 can couple the front head assembly 105 and the battery pack assembly 110, which can elastically fit the same to a head of an operator.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A headlamp assembly, comprising:

a first housing configured to be worn on a front surface of a head of an operator, the first housing comprising a light-emitting element and a secondary power source, the secondary power source being rechargeable;

a second housing separate from the first housing that is configured to be worn on a rear surface of the head of the operator, the second housing comprising a primary power source and a selector, the second housing being electrically coupled to the first housing, wherein the primary power source is disposable and not rechargeable; and circuitry configured to toggle power provided to the light-emitting element between the primary power source and the secondary power source based at least in part on an orientation of the selector.

2. The headlamp assembly according to claim 1, wherein the light-emitting element is a light-emitting diode (LED), and the selector is a selector switch configured to toggle between a first position and a second position.

3. The headlamp assembly according to claim 2, wherein the selector switch is disposed on a front surface of the second housing.

4. The headlamp assembly according to claim 3, wherein the first housing comprises a power button different from the selector switch that toggles the light-emitting element between at least on and off states.

5. The headlamp assembly according to claim 1, wherein the primary power source is at least one alkaline battery.

6. The headlamp assembly according to claim 1, wherein the secondary power source is at least one rechargeable battery selected from a group consisting of: nickel-cadmium (NiCd), nickel-metal hydride (NiMH), lithium-iron phosphate (LFP); rechargeable alkaline manganese (RAM); and lithium-ion (Li-ion).

7. A headlamp assembly, comprising:

a first power source and a second power source;

a front head assembly including a first housing, a light-emitting diode (LED), a power switch, the first power sources, and a charging port; and a rear battery pack assembly including a second housing, a selector switch, the second power source, and a pivoting arm that enables a front surface and a rear surface of the second housing to pivot relative to one another to expose the second power source;

wherein the front head assembly and the rear battery pack assembly are electrically coupled to one another; and wherein the selector switch is configured to select between the first power source and the second power source to power the LED.

8. The headlamp assembly of claim 7, wherein the power switch is configured to toggle the LED between different luminous intensities.

9. The headlamp assembly of claim 7, wherein the front head assembly and the rear battery pack assembly are coupled to one another via an elastic band.

10. The headlamp assembly of claim 7, wherein the selector switch is a bidirectional sliding switch that is situated on a front face of the second housing.

11. The headlamp assembly of claim 7, wherein the charging port is a universal serial bus (USB) port.

12. The headlamp assembly of claim 7, wherein the front head assembly further includes a bezel surrounding the LED to focus or direct light emitted by the LED.

13. A headlamp assembly, comprising:

a first housing configured to be worn on a front surface of a head of an operator, the first housing comprising a light-emitting element and a rechargeable power source;

a second housing separate from the first housing that is configured to be worn on a rear surface of the head of the operator, the second housing comprising a disposable power source and a selector, the second housing being electrically coupled to the first housing, wherein the disposable power source is not rechargeable; and circuitry configured to toggle power provided to the light-emitting element between the disposable power source and the rechargeable power source based at least in part on an orientation of the selector.

14. The headlamp assembly according to claim 13, wherein the light-emitting element is a light-emitting diode (LED), and the selector is a selector switch configured to toggle between a first position and a second position.

15. The headlamp assembly according to claim 13, wherein:

the disposable power source is at least one alkaline battery; and the rechargeable power source is at least one rechargeable battery selected from a group consisting of: nickel-cadmium (NiCd), nickel-metal hydride (NiMH), lithium-iron phosphate (LFP); rechargeable alkaline manganese (RAM); and lithium-ion (Li-ion).

16. The headlamp assembly according to claim 13, wherein the selector is a selector switch disposed on a front surface of the second housing and configured to toggle between a first position and a second position.

17. The headlamp assembly according to claim 13, wherein the first housing comprises a power button separate from the selector that toggles the light-emitting element between at least on and off states.

18. The headlamp assembly according to claim 13, wherein the first housing further comprises a charging port for charging the rechargeable power source.

19. The headlamp assembly according to claim 18, wherein the charging port is a universal serial bus (USB) port.

20. The headlamp assembly according to claim 13, wherein the first housing further comprises a bezel surrounding the light-emitting element to focus or direct light emitted by the light-emitting element.

21. The headlamp assembly according to claim 13, wherein the second housing comprises a pivoting arm that enables a front surface and a rear surface of the second housing to pivot relative to one another to expose the disposable power source.

22. The headlamp assembly according to claim 13, wherein the first housing and the second housing are coupled to one another via an elastic band and an electrical cable.

* * * * *